United States Patent
Gunther et al.

(10) Patent No.: US 6,662,552 B1
(45) Date of Patent: Dec. 16, 2003

(54) EXHAUST-GAS CLEANING SYSTEM AND METHOD WITH INTERNAL AMMONIA GENERATION, FOR THE REDUCTION OF NITROGEN OXIDES

(75) Inventors: Josef Gunther, Affalterbach (DE); Bernd Krutzsch, Denkendorf (DE); Christof Schoen, Remshalden (DE); Dirk Voigtlaender, Korntal-Muenchingen (DE); Miechel Weibel, Stuttgart (DE); Marko Weirich, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/744,030
(22) PCT Filed: Mar. 25, 2000
(86) PCT No.: PCT/EP00/02658
§ 371 (c)(1), (2), (4) Date: Dec. 3, 2001
(87) PCT Pub. No.: WO00/71865
PCT Pub. Date: Nov. 30, 2000

(30) Foreign Application Priority Data

May 19, 1999 (DE) .......................................... 199 22 961

(51) Int. Cl.$^7$ ................................................. F01N 3/00
(52) U.S. Cl. ........................... 60/286; 60/274; 60/303; 422/172
(58) Field of Search .......................... 60/274, 286, 300, 60/301, 303; 422/172, 183, 186, 186.01–186.04

(56) References Cited

U.S. PATENT DOCUMENTS

| 5,711,147 A | * | 1/1998 | Vogtlin et al. ................. 60/274 |
| 5,782,085 A | * | 7/1998 | Steinwandel et al. .......... 60/274 |
| 5,964,088 A | * | 10/1999 | Kinugasa et al. .............. 60/286 |
| 6,176,079 B1 | * | 1/2001 | Konrad et al. ................. 60/274 |
| 6,345,496 B1 | * | 2/2002 | Fuwa et al. .................... 60/274 |

FOREIGN PATENT DOCUMENTS

| EP | 0 802 315 | 10/1997 |
| WO | WO 97/17532 | 5/1997 |

* cited by examiner

Primary Examiner—Thomas Denion
Assistant Examiner—Binh Tran
(74) Attorney, Agent, or Firm—Crowell & Moring LLP

(57) ABSTRACT

An exhaust-gas cleaning system removes at least nitrogen oxides contained in exhaust-gas from a combustion source. An ammonia-generation catalytic converter generates ammonia using constituents of at least some of the exhaust gas emitted from the combustion source during ammonia-generation operating phases. Downstream a nitrogen oxide reduction catalytic converter reduces nitrogen oxides which are contained in the exhaust gas emitted from the combustion source using the ammonia generated as reducing agent. A nitrogen monoxide generation unit is situated outside the combustion source, for enriching the exhaust gas which is fed to the ammonia-generation catalytic converter with generated nitrogen monoxide during the ammonia-generation operating phases. The system is used for cleaning exhaust gases of motor vehicle internal-combustion engines which are operated predominantly in lean-burn mode, removing nitrogen oxides which are contained therein.

10 Claims, 1 Drawing Sheet

EXHAUST-GAS CLEANING SYSTEM AND METHOD WITH INTERNAL AMMONIA GENERATION, FOR THE REDUCTION OF NITROGEN OXIDES

BACKGROUND AND SUMMARY OF THE INVENTION

The invention relates to an exhaust-gas cleaning system for cleaning the exhaust gas from a combustion source so as to remove at least nitrogen oxides which are contained therein comprising an ammonia-generating catalytic converter for generating ammonia using constituents of at least some of the exhaust gas emitted from the combustion source during ammonia-generation operating phases, and a nitrogen oxide reduction catalytic converter which is connected downstream of the ammonia-generation catalytic converter, for reducing nitrogen oxides which are contained in the exhaust gas emitted from the combustion source using the ammonia generated as reducing agent therefor.

Exhaust-gas cleaning systems of this type are used in particular for exhaust-gas cleaning in motor vehicle internal-combustion engines and are described, for example, in publications EP 0 802 315 A2 and WO 97/17532 A1. They include a nitrogen oxide reduction catalytic converter for the selective catalytic reduction of nitrogen oxides which are contained in the exhaust gas emitted from the combustion source using ammonia as reducing agent, referred to for short as the SCR process. In order that it is not necessary to hold a stock of ammonia or a precursor in a tank, an ammonia-generation catalytic converter is connected upstream of the nitrogen oxide reduction catalytic converter, the ammonia-generation catalytic converter generating the ammonia which is required using constituents of at least some of the exhaust gas which is emitted from the combustion source during corresponding ammonia-generation operating phases, specifically by means of a synthesis reaction of hydrogen and nitrogen monoxide. In these ammonia-generation operating phases, a rich air ratio is set for the exhaust gas which is fed to the ammonia-generation catalytic converter, in order that sufficient hydrogen be available. In this context, the terms rich and lean air ratio, also known as the lambda value, are understood as meaning, as is customary, a composition of the exhaust gas or of the associated fuel mixture burnt in the combustion source which deviates from the stoichiometric composition by being fuel-rich or oxygen-rich, respectively. In this context, if only for fuel consumption reasons, it is desirable for the combustion source to be operated as much as possible in lean-burn mode and as little as possible in rich-burn mode, for example as a result of prolonged lean-burn operating phases alternating with brief rich-burn operating phases or, in the case of a multicylnder internal-combustion engine, only some of the cylinders, and preferably likewise only from time to time, being operated in rich-burn mode, whereas the other cylinders are continuously operated in lean-burn mode.

The ammonia-generation catalytic converter used is usually a three-way catalytic converter which contains as the catalyst material, by way of example, Pt and/or Rh supported on $\gamma\text{-}Al_2O_3$, which is suitable for catalysing the synthesis reaction of hydrogen and nitrogen monoxide to form ammonia. One difficulty of this exhaust-gas cleaning technique with internal ammonia generation is that, of the two exhaust-gas constituents which are required for the ammonia synthesis, namely hydrogen and nitrogen monoxide, the hydrogen content increases as the exhaust-gas composition becomes richer, while the nitrogen monoxide content decreases. In order to have sufficient hydrogen available in the exhaust gas for the ammonia synthesis, it is necessary to set a rich exhaust-gas composition, which is usually achieved by setting a corresponding operating state of the combustion source. However, the rich exhaust gas then emitted from the combustion source has only a relatively low nitrogen monoxide concentration, and without further measures this limits the synthesis reaction. On the other hand, it is desirable for it to be possible to generate as much ammonia as possible during these rich-burn operating phases, in order to keep the duration of the rich-burn operating phases as short as possible, for reasons of fuel consumption.

Therefore, the invention is based on the technical problem of providing an exhaust-gas cleaning system of the type described in the introduction with which a high yield of synthesized ammonia for use as a reducing agent for nitrogen oxides can be achieved in corresponding ammonia-generation operating phases with a rich composition of the exhaust gas fed to the ammonia-generation catalytic converter.

The invention solves this problem by providing an exhaust-gas cleaning system wherein a nitrogen monoxide generation unit is situated outside the combustion source and is operable to enrich the exhaust gas fed to the ammonia-generation catalytic converter with nitrogen monoxide during the ammonia-generation operating phases therefor. This system has a nitrogen monoxide generation unit outside the combustion source, which unit, during the ammonia-generation operating phases, enriches the exhaust gas fed to the ammonia-generation catalytic converter with nitrogen monoxide generated by this unit. In this way, in addition to the nitrogen oxide quantity which is already supplied by the combustion process in the combustion source but is limited on account of the rich composition of the fuel mixture burnt, additional nitrogen monoxide generated outside the combustion source is available for the ammonia synthesis in the ammonia-generation catalytic converter. As a result, it is possible to obtain a high yeild of ammonia during the ammonia -generation operating phases with a rich composition of the exhaust gas fed to the ammonia-generation catalytic converter, so that these rich-burn operating phases can be kept relatively short, which keeps fuel consumption at a low level.

The nitrogen monoxide generation unit used may in principle be any desired unit of this type which is familiar to the person skilled in the art. In a refinement of the invention, this unit includes a plasma generator, with which the nitrogen monoxide is generated by oxidation, using plasma technology, of nitrogen contained in a supplied gas stream, which may in particular be an air stream or an exhaust-gas stream formed by at least part of the exhaust gas emitted from the combustion source.

An advantageous embodiment of the invention is illustrated in the drawings and described below. In the drawings:

DETAILED DESCRIPTION OF THE DRAWINGS

Figure 1:
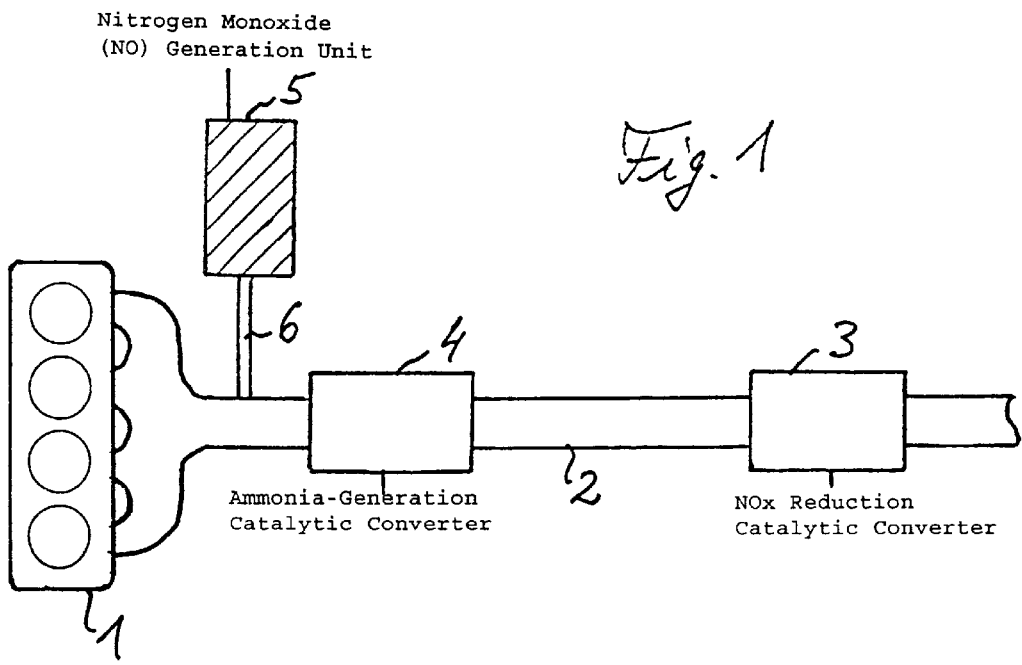
FIG. 1 shows a schematic block diagram of an internal-combustion engine with associated exhaust-gas cleaning system, and, FIG. 2 shows a diagram which qualitatively illustrates the hydrogen and nitrogen monoxide contents in the exhaust gas from the internal-combustion engine of FIG. 1 as a function of the air/fuel ratio of the mixture which is burnt.

FIG. 1 schematically depicts a four-cylinder internal-combustion engine 1, as can be used, for example, in a motor vehicle, and components of an associated exhaust-gas cleaning system, where they are of particular interest in the present context. In the example shown, the exhaust gas which is generated in the four cylinders of the internal-combustion engine 1 is connected in a single-passage exhaust train 2 and is discharged via the latter. To clean the nitrogen oxides out of the exhaust gas, a nitrogen oxide reduction catalytic converter 3 of conventional type is arranged in the exhaust train 2, which catalytic converter is designed for the catalytic reduction of nitrogen oxides using ammonia as reducing agent. The ammonia required is synthesized when the engine is running by an upstream ammonia-generation catalytic converter formed from hydrogen and nitrogen monoxide in accordance with the following synthesis reaction $$5H_2 + 2NO \rightarrow 2NH_3 + 2H_2O$$

under the action of a suitable catalyst material. The ammonia-generation catalytic converter 4 may, for example, as is known, be formed by a conventional three-way catalytic converter containing a suitable Pt and/or Rh catalyst material on an $Al_2O_3$ support.

In order to generate sufficient ammonia in this way, and thus to avoid or at least significantly reduce the need to hold a stock of ammonia or a precursor, such as urea, the exhaust-gas stream fed to the ammonia-generation catalytic converter 4 has to contain corresponding amounts of hydrogen and nitrogen monoxide, the theoretical ratio of hydrogen to nitrogen monoxide according to the above synthesis equation being 5:2. To ensure that the exhaust gas emitted from the internal-combustion engine 1 contains sufficient hydrogen, so that no additional hydrogen has to be supplied from the outside, the internal-combustion engine 1, during ammonia-generation operating phases, is operated, by an engine control unit (not shown), with a rich air/fuel mixture, i.e. with an air/fuel ratio $\lambda$ which is below the stoichiometric value of unity.

Figure 2:
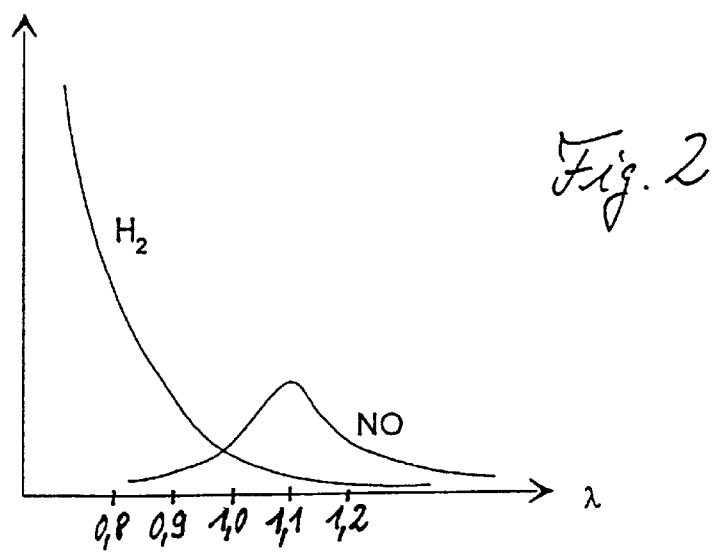

The diagram given in FIG. 2 provides a qualitative illustration of how the hydrogen concentration in the exhaust gas from the internal-combustion engine 1 rises significantly as the lambda value $\lambda$ falls from the stoichiometric value of unity, i.e. as the exhaust gas composition becomes richer, so that the amount of hydrogen required in each case can be provided by setting a suitably low lambda value $\lambda$. However, it can also be seen from FIG. 2 that as the lambda value $\lambda$ drops from the stoichiometric value of unity, the nitrogen monoxide concentration in the exhaust gas from the combustion source 1 falls considerably. More accurately, the corresponding nitrogen monoxide characteristic curve, as illustrated qualitatively in FIG. 2, has a maximum at a lambda value $\lambda$ of approximately 1.1, i.e. in the range of a lean exhaust-gas composition.

It is found that in many cases, after the lambda value $\lambda$ which is required in order to provide the hydrogen needed has been set, the amount of nitrogen monoxide which is then contained in the exhaust gas of rich composition is too low for an optimum yield of ammonia. To compensate for this, the exhaust-gas cleaning system has a nitrogen monoxide generation unit 5 which is arranged outside the internal-combustion engine 1 and is able to generate additional nitrogen monoxide, which is mixed with the exhaust-gas stream upstream of the ammonia-generation catalytic converter 4 via a feed line 6. As a result, the exhaust gas of rich composition which is emitted from the internal-combustion engine 1 and already has a hydrogen concentration which is sufficient to generate the desired quantity of ammonia, in addition to the limited amount of nitrogen monoxide provided by the combustion process in the internal-combustion engine 1 itself, is enriched with the nitrogen monoxide generated by the nitrogen monoxide generation unit 5 to such an extent that ammonia can be synthesized from the two constituents contained in the exhaust gas supplied, hydrogen and nitrogen monoxide, with an optimum yield in the ammonia-generation catalytic converter 4.

The ammonia which is generated in the ammonia-generation catalytic converter 4 passes, together with the exhaust-gas stream, into the downstream nitrogen oxide reduction catalytic converter 3. If, in this operating situation, the exhaust gas here still contains small quantities of nitrogen oxides, these nitrogen oxides are reacted with some of the ammonia as reducing agent. The remaining ammonia is temporarily stored in the nitrogen oxide reduction catalytic converter 3, for which purpose the latter has a corresponding ammonia storage capacity. Alternatively, a separate temporary ammonia accumulator of conventional type, for example in the form of an ammonia adsorption catalytic converter, may be connected upstream of the nitrogen oxide reduction catalytic converter 3.

As soon as a sufficient quantity of ammonia has been generated and temporarily stored in this way during an ammonia-generation operating phase, the control unit (not shown) switches over to a lean-burn operating phase, in which it runs the internal-combustion engine 1 with a lean air/fuel mixture and keeps the nitrogen monoxide generation unit 5 switched off. In this lean-burn operating phase, the ammonia-generation catalytic converter 4, if it is formed by a three-way catalytic converter, fulfils the customary lean-burn exhaust-gas cleaning function of a three-way catalytic converter of this type, and the higher levels of nitrogen oxides which are present in the exhaust gas on account of the lean-burn mode are converted into nitrogen and water in the nitrogen oxide reduction catalytic converter 3 by selective catalytic reduction with the temporarily stored ammonia as reducing agent, in accordance with the following reaction equations $$4NH_3 + 4NO + O_2 \rightarrow 4N_2 + 6H_2O$$

$$8NH_3 + 6NO_2 \rightarrow 7N_2 + 12H_2O.$$

In this way, the system is operated with periodic alternation between a lean and a rich lambda value $\lambda$ i.e. air ratio.

In an alternative embodiment of the invention, not all the cylinders of the internal-combustion engine are operated at the same air ratio, but only some of the cylinders are at least from time to time operated in rich-burn mode in order for ammonia to be generated, while the other cylinders are continuously run in lean-burn mode. The exhaust train is correspondingly divided into at least two parallel branches, and the ammonia-generation catalytic converter, together with the associated nitrogen monoxide generation unit, is arranged on that exhaust pipe branch which carries the exhaust gas from the cylinders which are operated in rich-burn mode at least from time to time. In this case, the latter cylinders may either be operated continuously in rich-burn mode or be operated so as to alternate periodically between rich-burn and lean-burn mode. The various exhaust pipe branches are then brought together again before they enter the nitrogen oxide reduction catalytic converter.

In a preferred design, the nitrogen monoxide generation unit 5 includes a plasma generator which, when activated, generates a hot plasma. A nitrogen-containing gas stream which is fed to the nitrogen monoxide generation unit 5 is passed through the hot plasma, the action of the plasma causing the nitrogen contained in the gas stream to be oxidized to form nitrogen monoxide. The nitrogen monoxide which is formed in this way is then mixed, together with the gas stream, via the feedline 6, with the exhaust-gas stream coming from the internal-combustion engine 1, so that this exhaust-gas stream is enriched with the nitrogen monoxide which is generated using plasma technology. The nitrogen-containing gas stream fed to the plasma which is used may be an air stream which is sucked in from the outside environment or an exhaust-gas part stream which comprises part of the exhaust gas emitted from the combustion source 1. The flow-guidance means which are required for this purpose, such as an air intake line or an exhaust-gas branch line which leads out of the exhaust train 2 at a location which is upstream of the opening of the feed line 6 and leads to the plasma generator 5, are familiar to the person skilled in the art and are therefore not shown in detail.

It will be understood that the invention can be used beneficially not only for internal-combustion engines of motor vehicles, but also for any other mobile or stationary combustion sources. In any event, the use according to the invention of the nitrogen monoxide generation unit outside the combustion source means that during the ammonia-generation operating phases with a rich composition of the exhaust gas fed into the ammonia-generation catalytic converter, it is possible to synthesize more ammonia than without this additional nitrogen monoxide generation, with the result that the number of rich-burn operating phases compared to lean-burn operating phases for the present exhaust-gas cleaning technique with selective catalytic nitrogen oxide reduction using internally generated ammonia can be reduced. As a result, the increased fuel consumption caused by the rich-burn mode for the internal ammonia generation is relatively low. It will be understood that, depending on the particular application, further exhaust-gas cleaning functions in addition to the nitrogen oxide reduction specifically described may be provided by appropriate further exhaust-gas cleaning components. Furthermore, should it prove expedient, a certain amount of ammonia or a precursor may additionally be metered from the outside into the exhaust train, in which case the amount of ammonia or the precursor which has to be held in stock can be kept at a lower level as a result of the internal ammonia generation than would be the case without the internal ammonia synthesis.

What is claimed is:

1. An exhaust-gas cleaning system for cleaning the exhaust gas from a combustion source, so as to remove at least nitrogen oxides which are contained therein, comprising:

an ammonia-generating catalytic converter for generating ammonia using constituents of at least some of the exhaust gas emitted from the combustion source during ammonia-generation operating phases, and a nitrogen oxide reduction catalytic converter which is connected downstream of the ammonia-generation catalytic converter, for reducing nitrogen oxides which are contained in the exhaust gas emitted from the combustion source using the ammonia generated as reducing agent, wherein a nitrogen monoxide generation unit is situated outside the combustion source and is operable to increase proportion of nitrogen monoxide in the exhaust gas to the ammonia-generation catalytic converter during the ammonia-generation operating phases.

2. The exhaust-gas cleaning system according to claim 1, wherein the nitrogen monoxide generation unit includes a plasma generator for oxidation of nitrogen contained in a supplied gas stream to form nitrogen monoxide using plasma technology.

3. A combustion engine exhaust gas processing system comprising:

an exhaust gas flow line operable to communicate exhaust gases away from an internal combustion engine, an ammonia-generating catalytic converter disposed in the exhaust gas flow line and operable to generate ammonia using constituents of at least some of the exhaust gases during ammonia-generation operating phases, a nitrogen oxide reduction catalytic converter arranged in the exhaust-gas flow line downstream of the ammonia-generating catalytic converter and operable to reduce nitrogen oxides contained in the exhaust-gas from the combustion engine using the ammonia as a reducing agent, and a nitrogen monoxide generation unit separate from the combustion engine and operable to generate and feed nitrogen monoxide to the exhaust-gas flow line to increase proportion of nitrogen monoxide in the exhaust at a position upstream of the ammonia generating catalytic converter.

4. The system according to claim 3, wherein the nitrogen monoxide generation unit includes a plasma generator for oxidation of nitrogen contained in a supplied gas stream to form nitrogen monoxide using plasma technology.

5. A vehicle engine assembly comprising:

a combustion engine which in use emits combustion exhaust gases, an exhaust-gas flow line operable to guide the exhaust gases away from the engine, an ammonia-generating catalytic converter disposed in the exhaust gas flow line and operable to generate ammonia using constituents of at least some of the exhaust gases during ammonia-generation operating phases, a nitrogen oxide reduction catalytic converter arranged in the exhaust-gas flow line downstream of the ammonia-generating catalytic converter and operable to reduce nitrogen oxides contained in the exhaust-gas from the combustion engine using the ammonia as a reducing agent, and a nitrogen monoxide generation unit separate from the combustion engine and operable to generate and feed nitrogen monoxide to the exhaust-gas flow line to increase proportion of nitrogen monoxide in the exhaust at a position upstream of the ammonia generating catalytic converter.

6. The vehicle engine assembly according to claim 5, wherein the nitrogen monoxide generation unit includes a plasma generator for oxidation of nitrogen contained in a supplied gas stream to form nitrogen monoxide using plasma technology.

7. The vehicle engine assembly according to claim 5, further comprising:

a control unit operable to control engine operations between rich and lean combustion processes, wherein during an ammonia generating phase the control unit switches mode of the combustion engine from lean-burn mode to rich-burn mode to generate hydrogen and activates said nitrogen monoxide generating unit to generate nitrogen monoxide.

8. A method of operating a vehicle engine assembly, wherein the engine assembly comprising:
- a combustion engine which in use emits combustion exhaust gases,
- an exhaust-gas flow line operable to guide the exhaust gases away from the engine,
- an ammonia-generating catalytic converter disposed in the exhaust gas flow line and operable to generate ammonia using constituents of at least some of the exhaust gases during ammonia-generation operating phases,
- a nitrogen oxide reduction catalytic converter arranged in the exhaust-gas flow line downstream of the ammonia-generating catalytic converter and operable to reduce nitrogen oxides contained in the exhaust-gas from the combustion engine using the ammonia as a reducing agent, and
- a nitrogen monoxide generation unit separate from the combustion engine and operable to generate and feed nitrogen monoxide to the exhaust-gas flow line to increase proportion of nitrogen monoxide in the exhaust at a position upstream of the ammonia generating catalytic converter,
- said method comprising selectively switching the nitrogen oxide generating unit on and off as a function of engine operating conditions.

9. The method of operating a vehicle engine assembly according to claim 8, wherein the nitrogen monoxide generation unit includes a plasma generator for oxidation of nitrogen contained in a supplied gas stream to form nitrogen monoxide using plasma technology.

10. The method of operating a vehicle engine assembly according to claim 8, comprising a control unit operable to control engine operations between rich and lean combustion processes, wherein during an ammonia generating phase the control unit switches mode of the combustion engine from lean-burn mode to rich-burn mode to generate hydrogen and activates said nitrogen monoxide generating unit to generate nitrogen monoxide.

* * * * *